US009386123B2

(12) United States Patent
Pan

(10) Patent No.: US 9,386,123 B2
(45) Date of Patent: Jul. 5, 2016

(54) DISTRIBUTED AUDIO PLAYBACK AND RECORDING

(71) Applicant: Adobe Systems Incorporated, San Jose, CA (US)

(72) Inventor: Mingliang Pan, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 250 days.

(21) Appl. No.: 13/948,395

(22) Filed: Jul. 23, 2013

(65) Prior Publication Data

US 2015/0032797 A1    Jan. 29, 2015

(51) Int. Cl.
*H04L 29/06* (2006.01)

(52) U.S. Cl.
CPC ............ *H04L 67/42* (2013.01); *H04L 65/4084* (2013.01); *H04L 65/602* (2013.01); *H04L 65/607* (2013.01)

(58) Field of Classification Search
CPC ............... H04N 21/41407; H04N 21/6125; H04N 21/64322; H04N 21/25808; H04N 21/233; H04N 21/2381; H04N 21/274; H04N 21/4823; G06F 17/30787; G06F 3/0656; G06F 17/3074; G06F 3/048; G06F 3/0482; G06F 3/16; G06F 3/165; G06F 3/167; H04L 2463/101; H04L 63/0428; H04L 63/10; H04L 12/1818; H04L 12/588; H04L 12/5895; H04L 51/063; H04L 51/32; H04L 51/38; H04L 65/1063; H04L 65/106; H04L 65/4084; H04L 67/42; H04L 65/60; H04L 29/06027; H04L 65/1059; H04L 65/1083; H04L 65/1089; G10H 1/18; H04H 60/04
See application file for complete search history.

(56) References Cited

U.S. PATENT DOCUMENTS 6,850,496 B1 * 2/2005 Knappe ................... H04M 3/56
                                                       370/260
6,922,730 B1 7/2005 Yaple
(Continued)

FOREIGN PATENT DOCUMENTS

WO        0163433 A1    8/2001
WO     2006130931 A1   12/2006
WO     2007084118 A1    7/2007

OTHER PUBLICATIONS

Crawford, "How Apple AirPlay Words", http://electronics.howstuffworks.com/airplay.htm (Jun. 27, 2011).
(Continued)

*Primary Examiner* — Kevin Bates
*Assistant Examiner* — Ranjan Pant
(74) *Attorney, Agent, or Firm* — Finch & Maloney PLLC

(57) ABSTRACT

Techniques are disclosed for providing distributed audio playback and recording functionality according to certain embodiments. In such embodiments one or more client audio devices can be connected to a server computing device via a network connection, thereby providing distributed audio playback and recording functionality to the server computing device. For example, audio tracks may be recorded at the server computing device based on audio signals collected from one or more remotely-located smartphones. In certain embodiments a transmission control protocol (TCP) network connection is used to transmit audio signals between the server computing device and the one or more remotely located client audio devices, thereby eliminating the need to provide physical cable connections between the devices. Distributing audio data over a network connection also reduces compatibility issues between audio software used by the server computing device and audio hardware provided by the one or more client audio devices.

25 Claims, 8 Drawing Sheets

(56) References Cited

U.S. PATENT DOCUMENTS

| | | | | |
|---|---|---|---|---|
| 7,631,119 B2 * | 12/2009 | Moore | ............... | H04N 21/4143 |
| | | | | 700/94 |
| 8,073,160 B1 * | 12/2011 | Classen | ................ | G11B 27/034 |
| | | | | 381/119 |
| 9,031,262 B2 * | 5/2015 | Silfvast | .................. | H04H 60/04 |
| | | | | 381/119 |
| 2011/0211524 A1 * | 9/2011 | Holmes | .................... | H04N 7/18 |
| | | | | 370/328 |
| 2012/0170469 A1 * | 7/2012 | Curcio | ................... | H04L 47/30 |
| | | | | 370/252 |
| 2012/0246355 A1 | 9/2012 | Scragg, Jr. et al. | | |

OTHER PUBLICATIONS

Gross, "Q-LAN", QSC Audio Products, LLC (Oct. 7, 2009).

Walker, "Audio Interface Manufacturers' Round Table", Sound on Sound (Dec. 2005).

"EtherSound ES-100 Audio Transport", available since Mar. 28, 2006 at http://www.ethersound.com/download/getinfo.php?edl_key=27.

"EtherSound ES-Giga System Transport", available since Mar. 28, 2006 at http://www.ethersound.com/download/getinfo.php?edl_key=26.

"EtherSound ES-100 Overview—An Introduction to the ES-100 Technology", Rev. 3.0b, available since Oct. 17, 2006 at http://www.ethersound.com/download/getinfo.php?edl_key=34.

"The Audio over IP Instant Expert Guide", Version 1.1, Tieline PTy. Ltd. (Jan. 2010).

"How to combine multiple audio interfaces by creating an aggregate device on Mac OS X v10.5 Leopard", available at http://support.apple.com/kb/HT1215 (last modified May 27, 2011).

EtherSound Technology Brochure, available since Mar. 28, 2006 at http://www.ethersound.com/download/getinfo.php?edl_key=25.

DLNA Technical Overview, availalbe at http://www.dlna.org/dlna-for-industry/digital-living/how-it-works/technical-overview (retrieved Jul. 9, 2013).

* cited by examiner

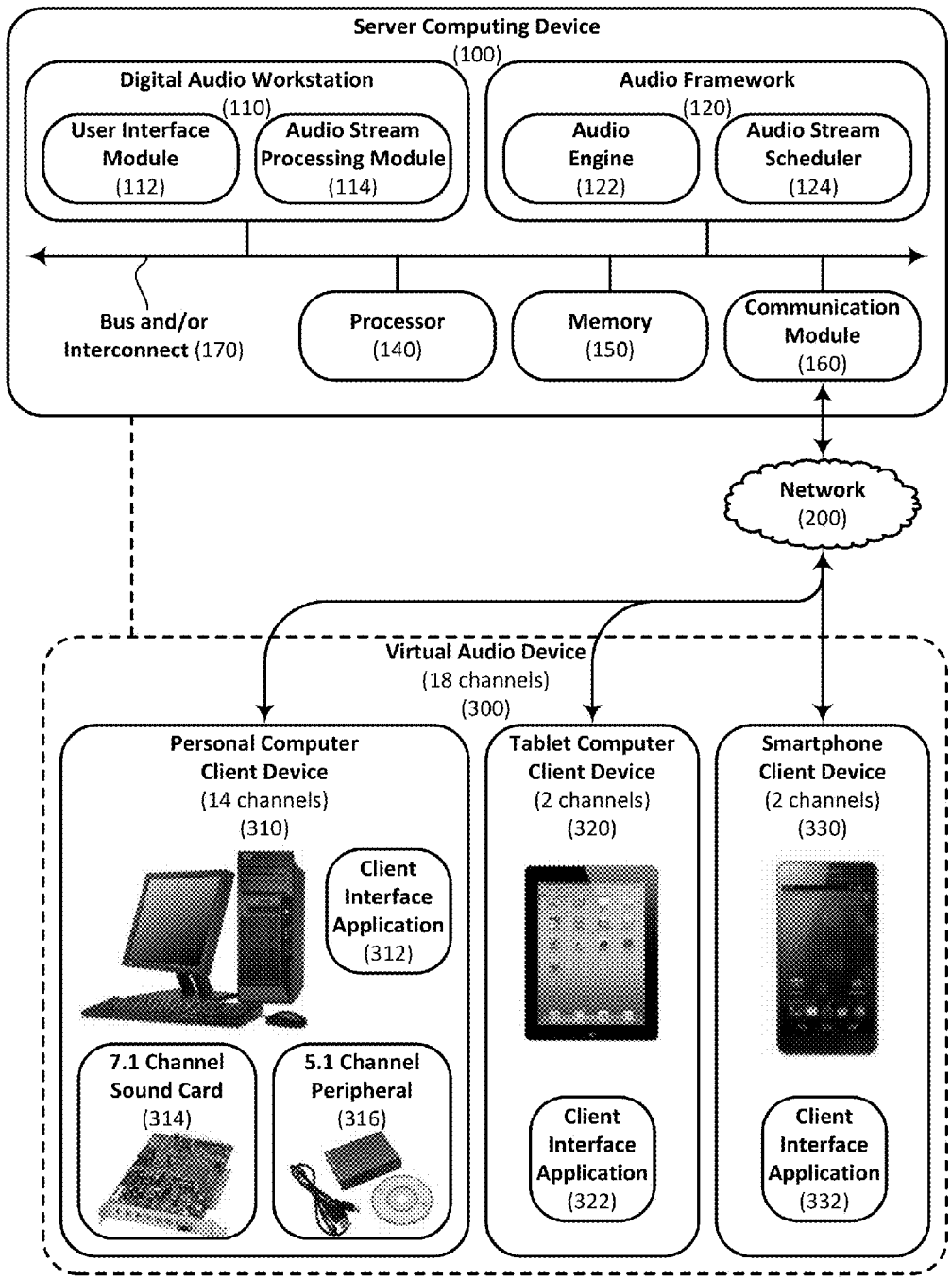

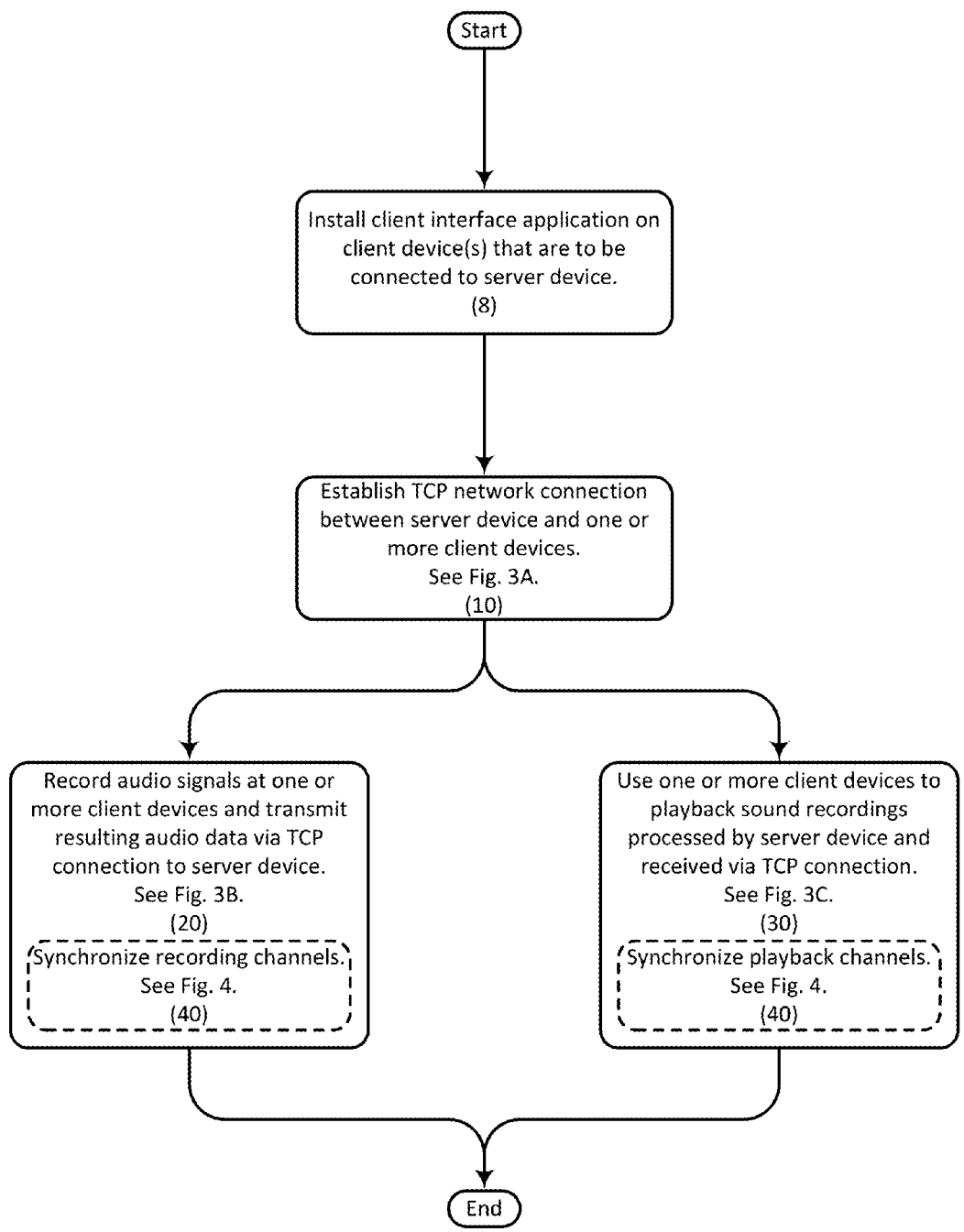

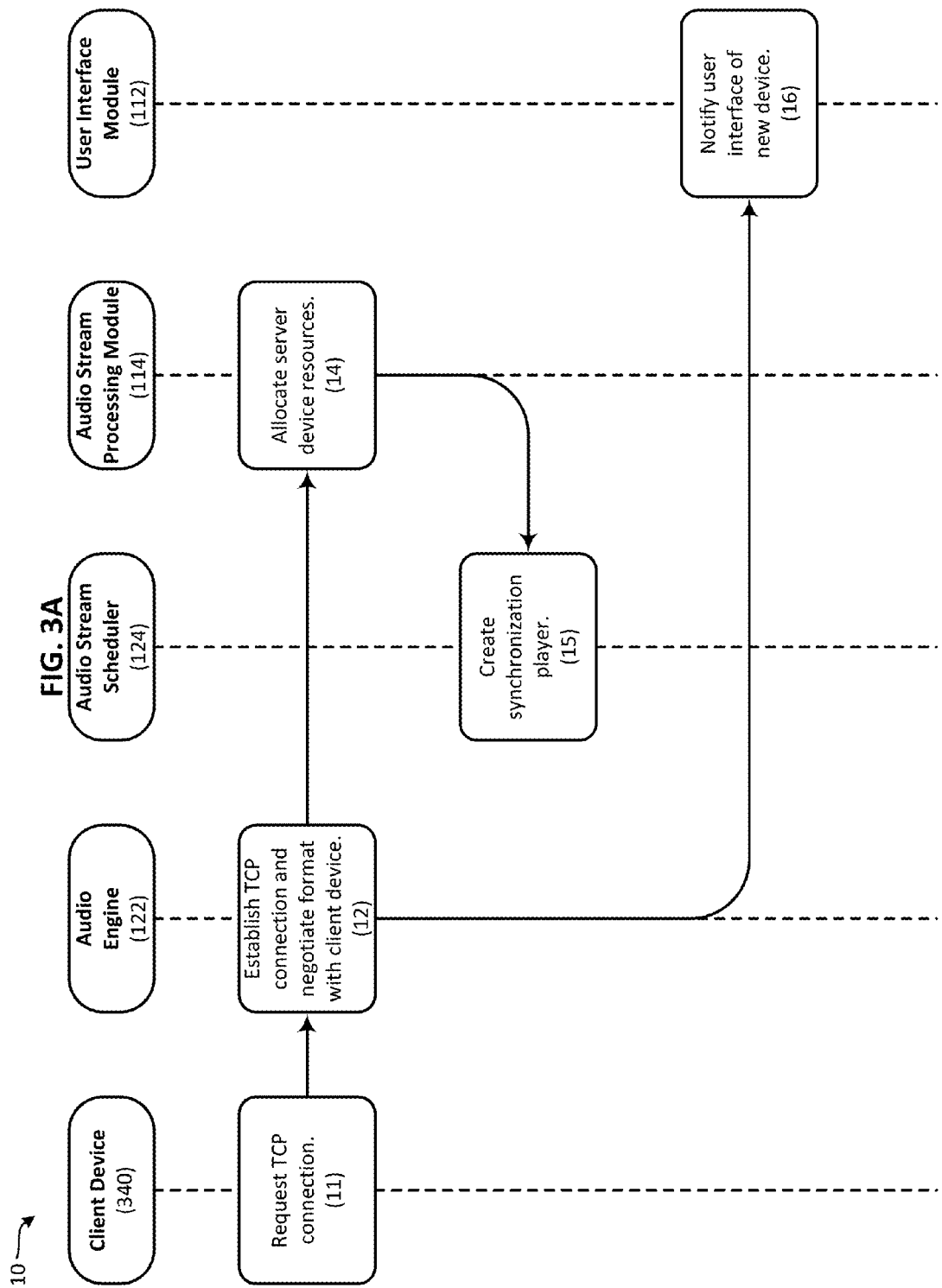

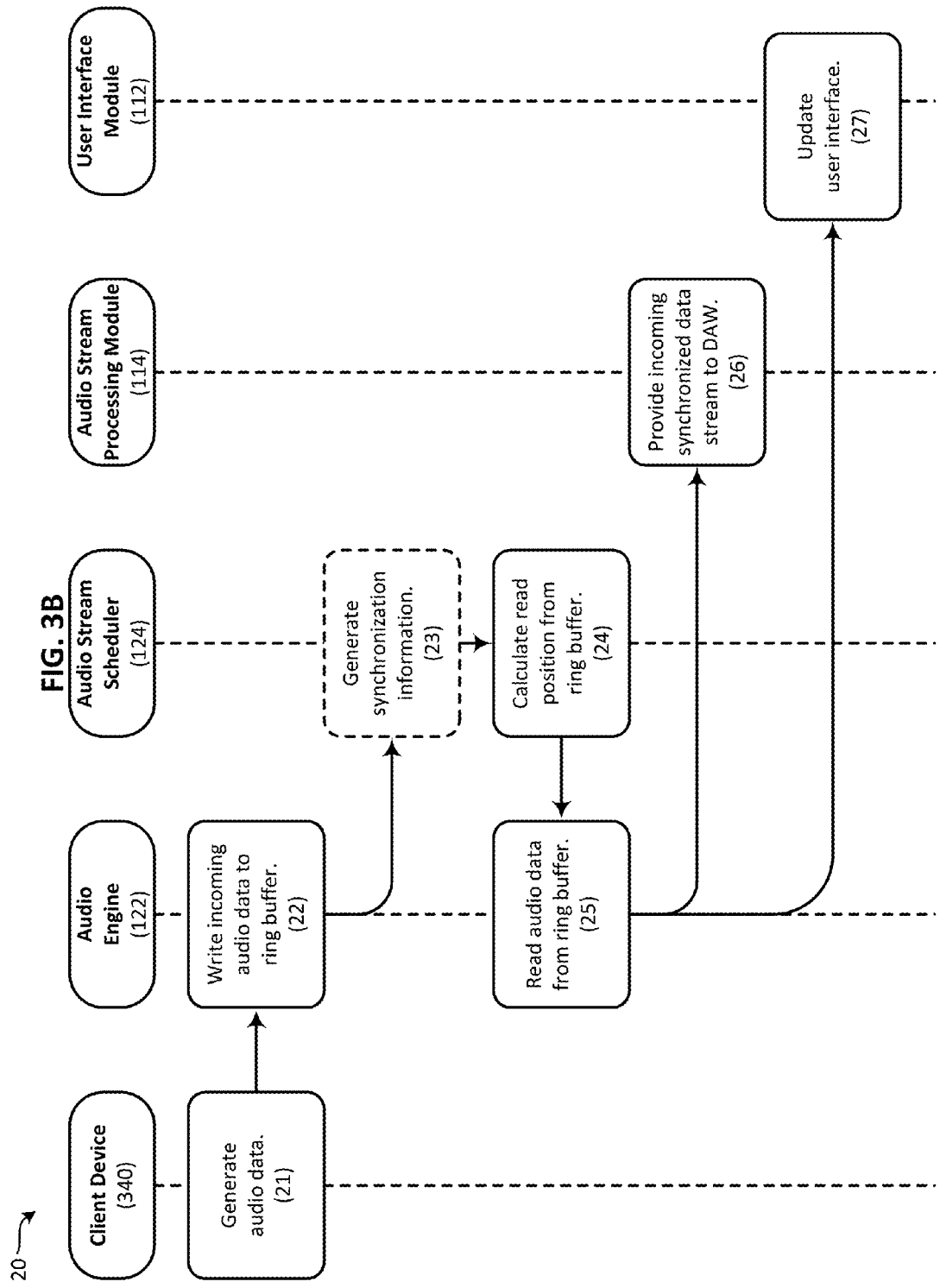

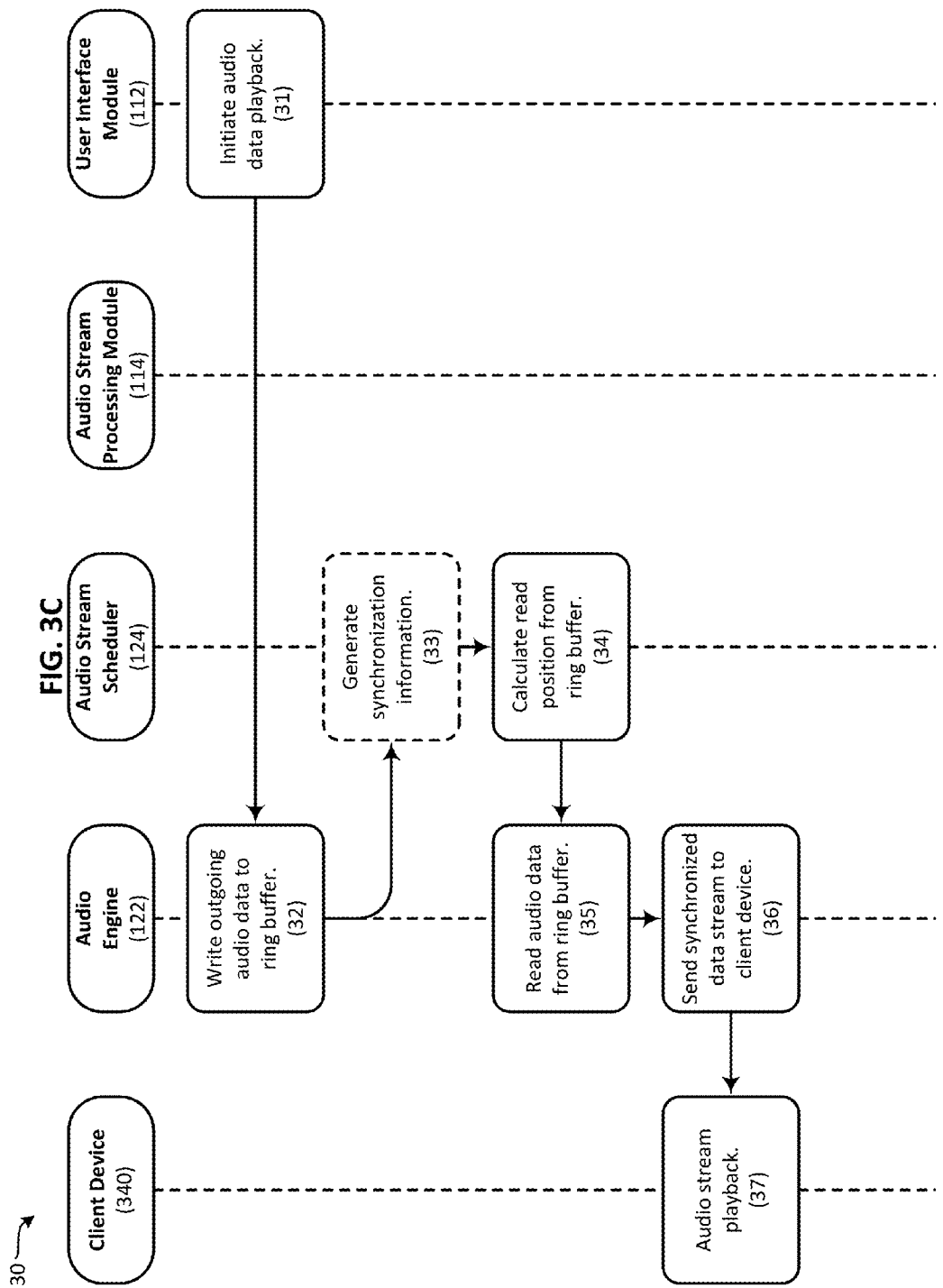

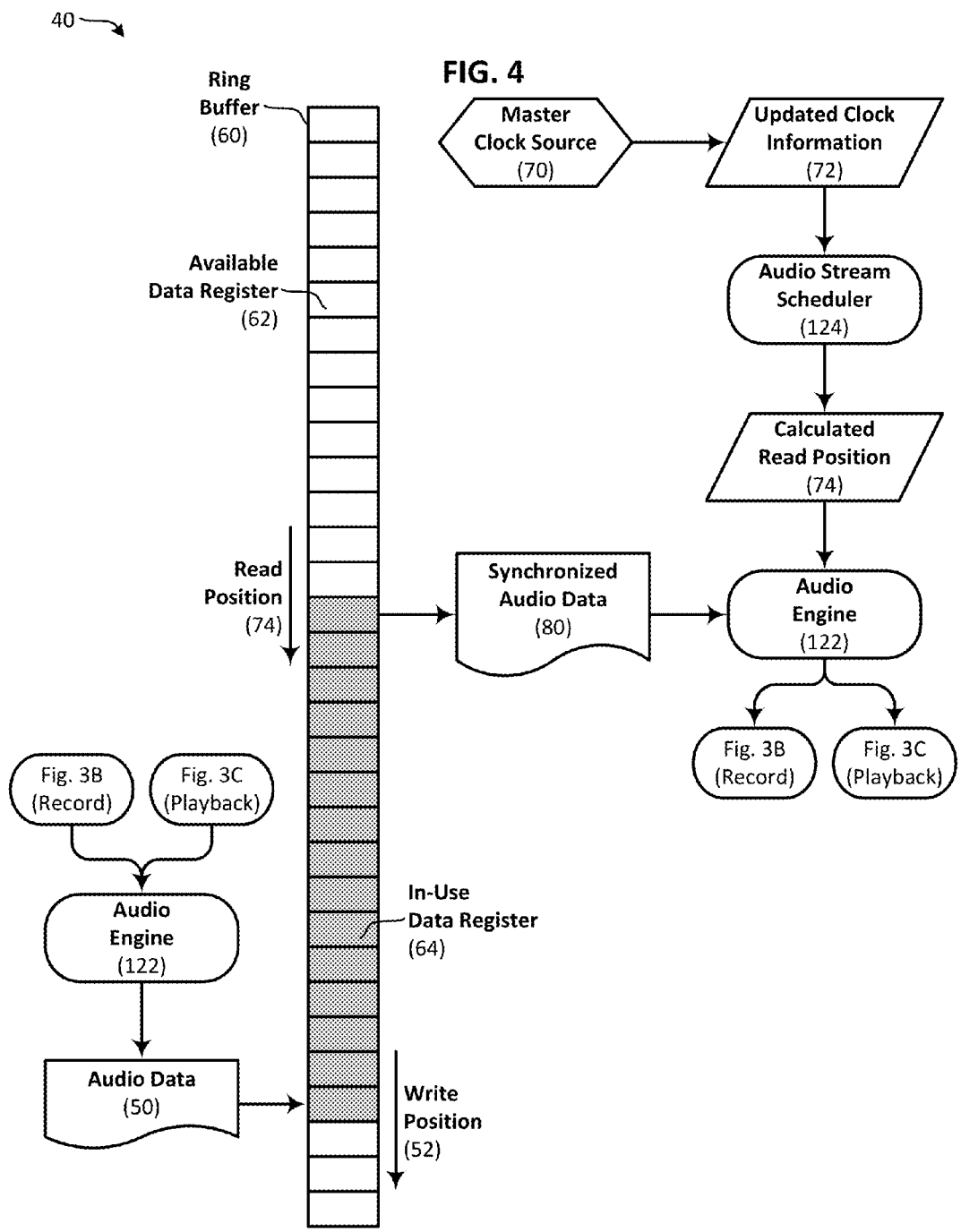

DISTRIBUTED AUDIO PLAYBACK AND RECORDING

FIELD OF THE DISCLOSURE

This disclosure relates generally to interactions between audio devices and computers, and more specifically to methods for enabling a computer to interact with audio devices over a network connection.

BACKGROUND

Audio playback and recording functionality has become an increasingly important aspect of modern computing devices. Devices such as desktop computers, laptop computers, tablet computers, personal media players and smartphones often include an integrated microphone and high fidelity speakers, thereby allowing users to interact with such devices verbally and aurally. These devices also often include hardware such as audio jacks and/or USB ports, thereby enabling them to be connected to peripheral audio components and providing extensibility to audio playback and recording functionality. As a result, consumers have grown to expect that they will be able to easily "talk to" and "listen to" their electronic devices, as well as to easily use such devices with existing systems such as home or car stereo systems and desktop speaker systems, all without the need for specific technological expertise. There has therefore been an increasing emphasis on improving the underlying hardware and software that enables computing devices and audio devices to interact.

BRIEF DESCRIPTION OF THE DRAWINGS

FIG. 1 is a block diagram schematically illustrating selected components of a computer system that can be used to provide distributed audio playback and recording functionality according to certain embodiments of the present invention.

FIG. 2 is a flowchart illustrating an example distributed audio playback and recording methodology that can be used in certain embodiments of the present invention.

FIG. 3A is a flowchart illustrating an example methodology that can be used in certain embodiments of the present invention for connecting one or more client devices to a server device via a TCP network connection.

FIG. 3B is a flowchart illustrating an example methodology that can be used in certain embodiments of the present invention for using a server device to record audio data that is collected by one or more client devices and that is received by the server device via a network connection.

FIG. 3C is a flowchart illustrating an example methodology that can be used in certain embodiments of the present invention for audio playback at one or more client devices that are connected to a server device via a network connection.

FIG. 4 is a block diagram illustrating an example audio sample synchronization methodology that can be used in conjunction with the recording and playback methodologies of FIGS. 3B and 3C.

DETAILED DESCRIPTION

Figure 5:
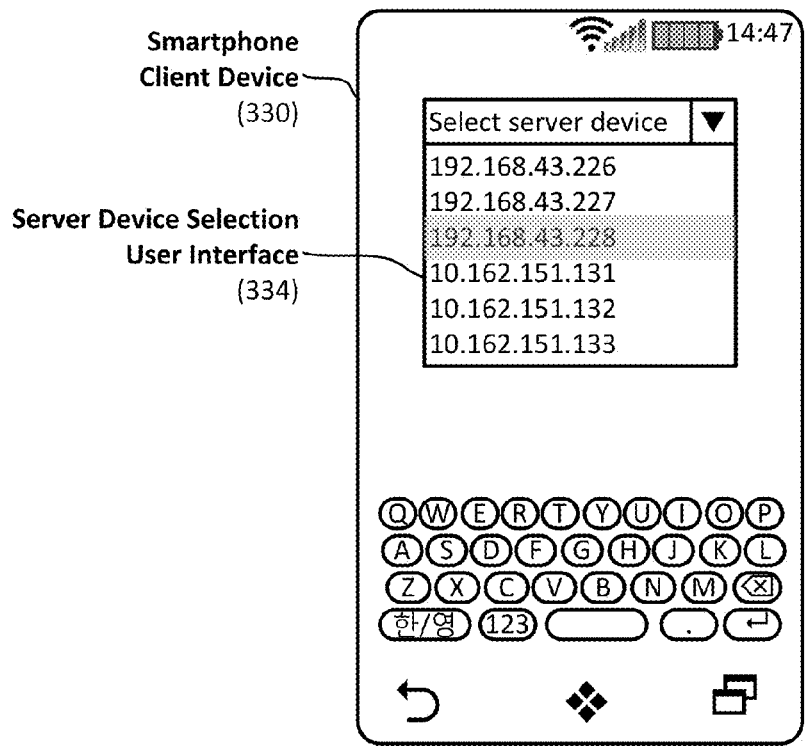
FIG. 5 illustrates an example server device selection user interface that can be used in certain embodiments of the present invention to select a server device to which a client device is to be connected.

Techniques are disclosed for providing distributed audio playback and recording functionality according to certain embodiments of the present invention. In certain embodiments one or more client audio devices can be connected to a server computing device via a network connection, thereby providing distributed audio playback and recording functionality to the server computing device. For example, audio tracks may be recorded at the server computing device based on audio signals collected from one or more remotely-located smartphones or microphones connected to the network. Or, audio tracks mixed and processed by the server computing device can be played back at one or more remotely-located tablet computers coupled to the network. Other configurations can be implemented in other embodiments. In certain embodiments a transmission control protocol (TCP) network connection is used to transmit audio signals between the server computing device and the one or more remotely located client audio devices, thereby eliminating the need to provide physical cable connections between the devices. Distributing audio data over a network connection also reduces compatibility issues between audio software used by the server computing device and audio hardware provided by the one or more client audio devices. Numerous configurations and variations of the distributed audio playback and recording techniques disclosed herein will be apparent in light of this disclosure.

General Overview

Modern computing devices, such as desktop computers, laptop computers, tablet computers, personal media players and smartphones, may be configured to interface with peripheral audio devices such as microphones and multichannel speaker systems. Peripheral audio devices may also include other computing devices having integrated audio componentry, such as a smartphone or a tablet computer. In this context, the computing device to which one or more peripheral audio devices is connected is may be referred to as a "server" or "host" device. Conventional techniques for interfacing between host and peripheral devices can lead to a diminished user experience. For instance, peripheral devices are linked to a host via a physical connection which can be provided by, for example, an audio cable, a universal serial bus (USB) cable, a peripheral component interconnect express (PCI-E) cable, or an Institute of Electrical and Electronics Engineers (IEEE) 1394 cable. However, such links often act as a physical constraint on the system, for instance due to physical limitations caused by cable length, or due to complexities that arise when large numbers of devices are to be interconnected. For example, many computer systems have a limited number of USB and/or PCI-E ports available for peripheral connections. Cabled connections can also be problematic when it is desired to move interconnected devices without severing an established connection. Furthermore, conventional audio interfacing methods generally require that audio processing software running on the host device can discover, communicate with, and use a given peripheral device. This can be accomplished, for example, through the use of an appropriate driver for the peripheral device. This may be a burden where multiple peripheral devices, each requiring a different driver, are to be used with a particular host device. Novice users may be unfamiliar with how to identify and install a driver that is appropriate for a given audio device. Even more problematic, audio processing software on a particular computing device may simply be incompatible with certain audio devices; that is, an appropriate driver may be unavailable. Many modern portable devices such as smartphones and tablet computers have integrated audio components which are not configured for use with the advanced digital audio workstation applications commonly used on desktop computers, thus preventing such applications from leveraging the functionality of audio components integrated into many portable devices. For example, a PCI-E sound card cannot be plugged into a laptop computer, thus making it impossible for a user of the laptop computer the leverage the functionality provided by a PCI-E sound card. This is the case even when such a sound card is available on a desktop computer that is connected to the laptop computer via a network. Furthermore, even where multiple peripheral devices are connected to a particular host device, conventional techniques do not allow the multiple peripheral devices to be combined into a single virtual device having different channels which can be used simultaneously by the host. Finally, depending on the particular devices to be interconnected, in some cases it may be necessary to install hardware that is specifically designed to enable such interfacing, such as a particular sound card, audio processor and/or USB audio interface.

Thus, and in accordance with an embodiment of the present invention, techniques are provided herein that facilitate distributed audio playback and recording in a networked environment. In such an embodiment, a TCP connection is established for two-way transfer of audio data between one or more peripheral audio devices and a host device. This allows the functionality provided by multiple distributed audio devices to be leveraged by the host without providing a physical cable connection between the host and the one or more peripherals. This increases system extensibility and flexibility, particularly with respect to the physical movement of devices after a connection has been established. In addition, the use of TCP networking techniques allows a large number of peripheral devices to be connected to the host simultaneously, with each peripheral input/output channel being assigned a unique Internet Protocol (IP) network address. For practical purposes, the number of peripheral devices that can be added to the network is essentially unlimited, and is likely to be constrained only by the available network bandwidth. The input/output channels of the peripheral devices can be mapped onto a single virtual device, thereby allowing the host to interact with the network of distributed peripherals as if they were a single multichannel device. A user may obtain additional working input/output channels simply by connecting additional appropriate peripheral devices to the network.

Establishing a TCP connection for two-way audio data transfer between a host and one or more peripheral devices also allows audio software running on the host to leverage functionality provided by the peripheral devices. This can be accomplished even where the audio software nominally requires a sound card associated with any peripheral devices to be physically connected to the host device, such as via a USB, IEEE 1394, or PCI-E connection. For example, a digital audio workstation application can be used to provide a host device with a wide range of advanced audio recording, editing and playback functionality. Examples of such digital audio workstation applications include ADOBE® AUDITION™ CC (Adobe Systems Incorporated, San Jose, Calif.), PRO TOOLS® (Avid Technology, Burlington, Mass.), FL STUDIO™ (Image-Line Software, Sint-Martens-Latem, Belgium), and CUBASE® (Steinberg Media Technologies, Hamburg, Germany). Digital audio workstations such as these are compatible with a wide range of peripheral audio devices, but they generally require a sound card associated with any peripheral device to be physically connected to the host. Using a TCP connection to map a plurality of peripheral devices onto one channelized virtual device that is compatible with the digital audio workstation eliminates the need to separately obtain and install appropriate drivers for each of the peripheral devices.

Thus, certain of the embodiments disclosed herein advantageously allow a user to simultaneously take advantage of both (a) the advanced processing capacity of desktop-based digital audio workstation applications, as well as (b) the ubiquity of portable devices that may have a limited audio processing capacity, such as many smartphones and tablet computers. For instance, such embodiments can be used to mix, process and stream a complex multichannel media asset to a network of distributed tablet computers. Where the media asset to be played back is processed by a host device capable of advanced audio processing, such as the processing associated with 5.1 channel surround sound playback, the results of this processing can be passed to a network of devices with limited audio processing capability, such as a network of smartphones. By placing multiple smartphones appropriately and distributing different surround sound channels to different smartphones, this allows 5.1 channel surround sound to be simulated using only the smartphones, which would normally be incapable of replicating surround sound playback. Likewise, other embodiments of the systems disclosed herein can be used to simultaneously perform multi-take recording of audio collected by a network portable audio devices in geographically diverse locations. For example, a plurality of appropriately-located smartphones could be used as a set of distributed microphones to generate a multi-track recording of an orchestral performance. It will be appreciated in light of this disclosure that these are only a few of a wide range of different applications for the various systems disclosed herein, and that other configurations and uses will be apparent in other embodiments.

For example, while some examples provided herein relate to how a peripheral device can leverage resources provided by a more powerful host device, it will be appreciated that in other configurations the leveraging can operate in the opposite direction. For instance, a laptop computer that has a limited ability to interface with multichannel input/output audio devices can be configured to act as a host device. An advanced digital audio workstation application can be installed on the laptop computer, and TCP connections can be established with peripheral audio devices, such as a more powerful desktop computer having a 5.1 channel surround sound USB peripheral device and/or a 7.1 channel surround sound PCI-E sound card. The desktop computer can then be connected to more complex audio input/output devices, such as a surround sound speaker system or a network of professional-quality microphones used, for example, to record an orchestral performance. This configuration allows the laptop to act as a host device interfacing with a single multichannel virtual device having all the technical capabilities of the desktop computer and its associated audio devices. The digital audio workstation can then process all of the channels simultaneously, just as if a single multichannel device were connected to the laptop computer. In this configuration, the desktop computer acts as a client on the TCP network.

It will be appreciated that the distributed audio playback and recording methodologies disclosed herein can be applied to a wide variety of digital media assets, including audio assets, video assets and multimedia assets. Such assets can be stored in a wide variety of file formats. For example, audio assets can be stored using file formats such as the waveform audio file format (WAV), the audio interchange file format (AIFF), any suitable file format defined by the Moving Picture Experts Group (MPEG) including MPEG-4 and MP3, any suitable file format using advanced audio coding (AAC), or any other suitable compressed or uncompressed file format capable of recording audio waveforms that represent sound recordings and/or other discrete audio samples. In certain embodiments audio assets comprising note lists and instrument descriptions for music synthesis can be recorded and stored using the musical instrument digital interface (MIDI) standard. Video assets can be accessed by the system in conjunction with, for example, the editing of an audio asset that is to be used in a sound for picture application. In general, it will be appreciated that the methodologies disclosed herein can be applied to a wide variety of media assets stored in a wide variety of formats, and are not intended to be limited to any particular asset type or storage format.

System Architecture

FIG. 1 is a block diagram schematically illustrating selected components of a computer system that can be used to provide distributed audio playback and recording functionality according to certain embodiments of the present invention. As illustrated, the methodologies disclosed herein can be viewed as a series of interactions between a server computing device 100 and one or more client devices, such as a personal computer client device 310, a tablet computer client device 320, and/or a smartphone client device 330. Even though they may be physically separate components, the various client devices 310, 320, 330 can be collectively considered as a single virtual client device 300 having the combined functionality provided by individual client devices 310, 320, 330. As suggested by these examples, both the server and the client may comprise, for example, one or more devices selected from a desktop computer, a workstation, a tablet computer, a smartphone, a set-top box, or any other such computing device. A combination of different devices may be used in certain embodiments. Server device 100 and client device 300 can be coupled to a network 200 to allow for communications with each other, as well as with other resources and/or devices as appropriate. Other componentry and functionality not reflected in the illustrations will be apparent in light of this disclosure, and it will be appreciated that the claimed invention is not intended to be limited to any particular hardware configuration or components. Thus, in other embodiments server device 100 and client device 300 may comprise additional or alternative subcomponents as compared to those illustrated in the example embodiment of FIG. 1.

In the illustrated example embodiment, server device 100 includes, among other things, a digital audio workstation 110, an audio framework 120, a processor 140, a memory 150 and a communication module 160. Digital audio workstation 110 may comprise, for example, a software application specifically configured for the manipulation of digital audio, video and/or multimedia assets. Digital audio workstation 110 can be used to provide server device 100 with a wide range of advanced audio recording, editing and playback functionality, and may include subcomponents such as a user interface module 112 and an audio stream processing module 114. In such embodiments, user interface module 112 can be used to provide a user with access to the functionality associated with digital audio workstation 110, and can also be used to provide information regarding the operational status of server device 100 to the user. For example, user interface module 112 can be configured to provide transport controls for recording, playing and cueing sound recordings; channel controls for manipulating the channels that comprise a sound recording; and a waveform display for providing a visual image of a waveform representing a sound recording. Such controls may form part of a virtual multichannel mixing console corresponding to the various audio channels available to server device 100. User interface module 112 can also be configured to display messages regarding network connections between server device 100 and the one or more client devices 310, 320, 330. Additional or alternative user interface elements may be provided in other embodiments. In addition, user interface module 112 can be configured to work with a variety of different hardware platforms, including touchscreen devices and mobile devices.

Audio stream processing module 114 can be used to provide the functionality underlying the user interface; such functionality may include, for example, recording audio signals generated by an audio sources, processing and modifying such signals based on user input, and playing back the modified signals using an audio output device. Examples of signal processing that may be provided by audio stream processing module 114 include one or more of adjusting volume, balancing, filtering, applying special effects, applying reverberation, de-noising, pitch shifting or any other suitable digital signal processing techniques. Local caching and speculative look-ahead can be used to reduce play start latency at the audio output device. The functionality of audio stream processing module 114 can be applied to recorded signals as well as in conjunction with the recording of live sound. In certain embodiments audio stream processing module 114 can also be used to allocate processing resources available to server device 100, such as resources provided by processor 140 or by networked digital signal processing hardware. Additional or alternative functionality may be provided by audio stream processing module 114 in other embodiments.

In certain embodiments audio framework 120 may comprise software and/or firmware enabling the server device 100 to communicate with a given client device. For example, in one embodiment audio framework 120 comprises a driver configured to interface with, and take advantage of the functionality provided by, virtual client device 300, thereby eliminating the need to obtain drivers for each of the individual client devices 310, 320, 330. Audio framework 120 may be implemented as lower level modules forming part of digital audio workstation 110. In certain embodiments, audio framework 120 may include subcomponents such as an audio engine 122 and an audio stream scheduler 124. Audio engine 122 may include a TCP server thread that can be used to interface with client devices connected to server device 100 via network 200. In such embodiments audio engine 122 can be used to establish TCP connections and negotiate communication protocols with client devices. Audio engine 122 can also be used to read and write data from a server-side ring buffer used in connection with TCP network communications. Such a ring buffer can be used to manage audio data exchange amongst client devices using different clock frequencies, as well as to address unstable TCP data transfer rates. To this end, audio stream scheduler 124 can be used to manage the ring buffer, and in particular, to provide audio stream synchronization for data received from or transmitted to the network via a TCP connection.

Still referring to the example embodiment illustrated in FIG. 1, processor 140 can be any suitable processor, and may include one or more coprocessors or controllers, such as an audio processor or a graphics processing unit, to assist in processing operations of server device 100. Memory 150 can be implemented using any suitable type of digital storage, such as one or more of a disk drive, a USB drive, flash memory and/or random access memory. Communications module 160 can be any suitable network chip or chipset which allows for wired and/or wireless communication to network 200 such that server device 100 can communicate with other local and/or remote computing resources and/or devices. Network 200 may be a local area network (such as a home-based or office network), a wide area network (such as the Internet), or a combination of such networks, whether public, private or both. In some cases access to resources on a given network or computing system may require credentials such as usernames, passwords and/or any other suitable security mechanism. A bus and/or interconnect 170 may also be provided to allow for inter- and intra-device communications using, for example communications module 160 and/or network 200.

As described above, the methodologies disclosed herein can be viewed as a series of interactions between a server computing device 100 and one or more client devices 310, 320, 330. In general, such client devices (a) provide audio recording and/or playback functionality via one or more audio channels, and (b) are capable of establishing a network connection with server device 100 via network 200. For example, as illustrated in FIG. 1, personal computer client device 310 comprises a personal computer including audio peripherals such as a 7.1 channel surround sound PCI-E sound card 314 and a 5.1 channel surround sound USB peripheral device 316. Such devices collectively provide personal computer client device 310 with fourteen channels which can be used for audio signal playback and/or recording. Thus device 310 could be used, for example, to process and playback a 7.1 channel surround sound audio recording. Additional examples of client devices which may be connected to server device 100 include tablet computer client device 320 and smartphone client device 330, each of which provide two channels which can be used for audio signal playback and/or recording. Additional or alternative devices can be connected to server device 100 in other embodiments, and it will be appreciated that the present invention is not intended to be limited to any particular type or combination of client devices which are connected to server device 100 via network 200.

In certain embodiments client devices 310, 320, 330 can be provided with a client interface application 312, 322, 332 that presents a uniform interface to server device 100 and that manages format negotiation with server device 100 for parameters such as sample rate, sample bit depth and channel quantities. Client interface applications 312, 322, 332 can be generalized applications developed for the operating system used by a particular client, and need not be specifically tailored to an individual client device itself. For example, a client interface application developed for the GOOGLE® ANDROID™ operating system can be used to leverage the functionality provided by ANDROID™-based devices generally, thereby eliminating any need to provide applications which are specifically configured for use with a particular ANDROID™-based smartphone. Client interface applications for other operating systems, such as APPLE® IOS® and MICROSOFT® WINDOWS®, may be provided as well. Using client interface applications 312, 322, 332 to present a uniform communication interface to server device 100 allows server device 100 to interact with client devices 310, 320, 330 as a single virtual client device 300, even though they may comprise physically separate components which are widely distributed geographically. In such embodiments, virtual client device 300 has the combined functionality provided by individual client devices 310, 320, 330. For instance, in the example embodiment illustrated in FIG. 1, virtual client device 300 provides eighteen channels that can be used for audio input/output, which is the sum of the fourteen channels provided by personal computer client device 310, the two channels provided by tablet computer client device 320, and the two channels provided by smartphone client device 330. This advantageously allows server device 100 to leverage the diverse range of functionality provided by client devices 310, 320, 330 without the need to obtain and install multiple specialized drivers for the various client devices.

The various embodiments disclosed herein can be implemented in various forms of hardware, software, firmware and/or special purpose processors. For example in one embodiment a non-transitory computer readable medium has instructions encoded thereon that, when executed by one or more processors, cause one or more of the distributed audio playback and recording methodologies disclosed herein to be implemented. The instructions can be encoded using a suitable programming language, such as C, C++, object-oriented C, JavaScript, or BASIC, or alternatively, using custom or proprietary instruction sets. The instructions can be provided in the form of one or more computer software applications and/or applets that are tangibly embodied on a memory device, and that can be executed by a computer having any suitable architecture. In another embodiment, the system can be hosted on a given website and implemented, for example, using JavaScript or another suitable browser-based technology. For instance, as described above, in certain embodiments server device 100 includes a digital audio workstation specifically designed to enable digital audio, video and/or multimedia assets to be manipulated by a user of a portable computing device. In other embodiments the functionalities disclosed herein can be incorporated into other software applications, such as video editing applications, audio recording applications, or other content generation, modification and/or management applications. The computer software applications disclosed herein may include a number of different modules, sub-modules or other components of distinct functionality that can provide information to, or receive information from, other components. These modules can be used, for example, to communicate with input and output devices such as pointing devices, display screens, touchscreens, and/or other user interface elements.

The non-transitory computer readable medium may be any suitable medium for storing digital information, such as a hard drive, a server, flash memory and/or random access memory. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routes for carrying out the various functionalities disclosed herein. It will be apparent that any suitable combination of hardware, software and firmware can be used, and that the present invention is not intended to be limited to any particular system architecture.

Recording/Playback Methodology and User Interface

The example methodologies disclosed herein include a number of phases and sub-processes, the sequence of which may vary from one embodiment to another. However, when considered in the aggregate, these phases and sub-processes form a complete distributed audio playback and recording methodology that is responsive to user interaction in accordance with certain of the embodiments disclosed herein. These methodologies can be implemented, for example, using the system architecture illustrated in FIG. 1, as described above. However, other system architectures can be used in other embodiments, as will be apparent in light of this disclosure. To this end, the correlation of the various functionalities illustrated in FIGS. 2, 3A, 3B, 3C and 4 to the specific components illustrated in FIG. 1 is not intended to imply any structural and/or use limitations. Rather, other embodiments may include, for example, varying degrees of integration wherein multiple functionalities are effectively performed by one system, such as where a single module is used both to read and write data from a server-side ring buffer, as well as to provide audio stream synchronization for data communicated via a TCP connection. Thus, other embodiments may have fewer or more modules depending on the granularity of implementation. Numerous variations and alternative configurations will be apparent in light of this disclosure.

FIG. 2 is a flowchart illustrating an example distributed audio playback and recording methodology 5 that can be used in certain embodiments of the present invention. Methodology 5 commences with installing a client interface application on one or more client devices which are to be connected to a server device (8). As explained above, in certain embodiments the client interface application is a generalized application that is developed for the operating system used by a particular client, and that is configured to manage format negotiation with, and present a uniform interface to, a server device. A TCP network connection can then be established between the server device and the one or more client devices (10). An example embodiment for establishing the TCP connection is illustrated in FIG. 3A and is described in greater detail below. Once such a connection has been established, it is possible to record audio signals at the one or more client devices and to transmit the resulting audio data via the TCP connection to the server device (20). An example embodiment for such recording is illustrated in FIG. 3B and is described in greater detail below. The one or more client devices can also be used to playback sound recordings processed by the server device and received via the TCP connection (30). An example embodiment for such playback is illustrated in FIG. 3C and is described in greater detail below. Such recording and playback includes synchronization of the audio data transmitted over the TCP connection (40), an example embodiment of which is illustrated in FIG. 4 and is described in greater detail below. It will be appreciated that the recording and playback functionalities may be performed simultaneously.

FIG. 3A is a flowchart illustrating an example methodology 10 that can be used in certain embodiments of the present invention for connecting one or more client devices to a server device via a TCP network connection. Methodology 10 commences when a selected client device 340 requests that a TCP connection be established with server device 100 (11). In certain embodiments, such a request can be initiated using a client interface application installed on client device 340. Such a client interface application can be configured to manage the establishment of a TCP connection in a client-server computing environment. This may include, among other things, assigning an IP address to client device 340, thereby allowing client device 340 to be uniquely identified by server device 100. The client interface application can be used to present a uniform communication interface to server device 100, thereby eliminating any need to provide server device 100 with drivers or other software specifically configured for the particular hardware associated with client device 340. This enables server device 100 to act as a TCP server on network 200.

In one embodiment, client interface application provides a server device selection user interface to facilitate the establishment of a TCP connection with server device 100. FIG. 5 illustrates an example embodiment of such a server device selection user interface 334. User interface 334 can be provided, for example, on smartphone client device 330, although similar user interfaces can be provided on other types of client devices. User interface 334 includes a listing of server devices, identified by IP address, that are detected as being present on a particular network to which client device 330 is connected. The client interface application can be configured to establish an appropriate TCP network connection in response to a user selection of a particular server device included in such listing. Although the example embodiment illustrated in FIG. 3A indicates that client device 340 initially requests the TCP connection, it will be appreciated that server device 100 may initiate the request for a TCP connection in other embodiments, for example using a corresponding server interface application running on server device 100. Likewise, in other embodiments the available connections listed in user interface 334 can be identified by something other than IP address, such as by a user-defined device name.

Referring again to FIG. 3A, in certain embodiments the aforementioned request for a TCP connection is received by audio framework 120, and in particular, by audio engine 122. For example, in response to receiving such a request, audio engine 122 can be configured to establish a TCP connection and negotiate communication protocols with client device 340 (12). This may include, for instance, managing format negotiation between the devices for parameters such as sample rate, sample bit depth and channel quantities. Once such format negotiation has occurred, the devices are capable of communicating with each other using the newly established TCP connection. Use of a TCP connection in this regard allows, for example, client device 340 send audio data collected using a microphone to server device 100 continuously while simultaneously receiving audio data from server device 100 for playback using a speaker continuously.

Figure 6:
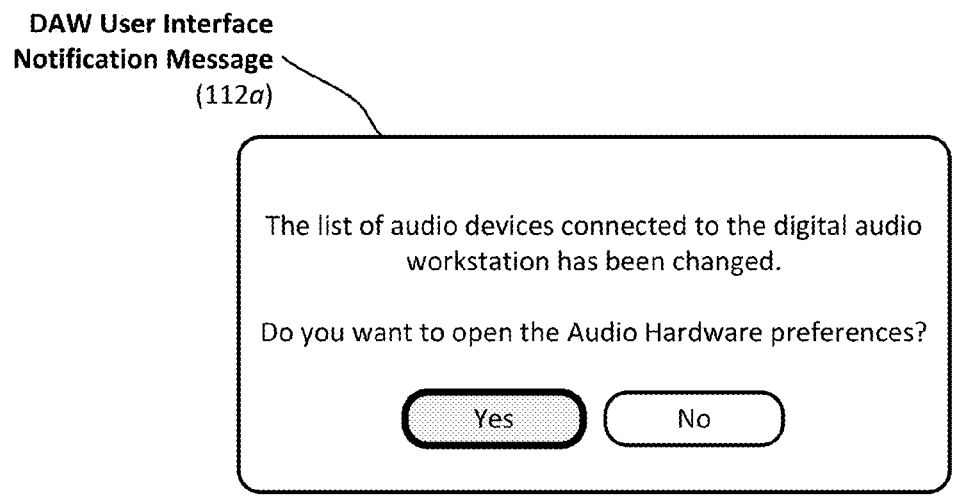
FIG. 6 illustrates an example user interface that can be used in certain embodiments of the present invention to inform a user of a server device that a new incoming client device connection is available.

Once a TCP connection has been established, server-side resources for handling such two-way data transfer streams are allocated (14). Such resource allocation can be managed by digital audio workstation 110, and in particular, by audio stream processing module 114. For example, in one embodiment memory resources are allocated for use as a ring buffer to store incoming and outgoing audio data. In another embodiment, processor resources are allocated for the creation of a synchronization player to (a) manage audio data exchange amongst the networked client devices using different clock frequencies and (b) address unstable TCP data transfer rates. In such embodiments the synchronization player can be created and managed by audio stream scheduler 124 (15). User interface module 112 is configured to detect the presence of the newly connected client device 340, and in response thereto, to generate a notification indicating the availability of such device (16). FIG. 6 illustrates an example embodiment of such a digital audio workstation user interface notification message 112a. Such a notification optionally provides the user with the ability to access audio hardware settings to configure how digital audio workstation 110 interacts with audio channels provided by the newly connected client device 340.

Figure 7:
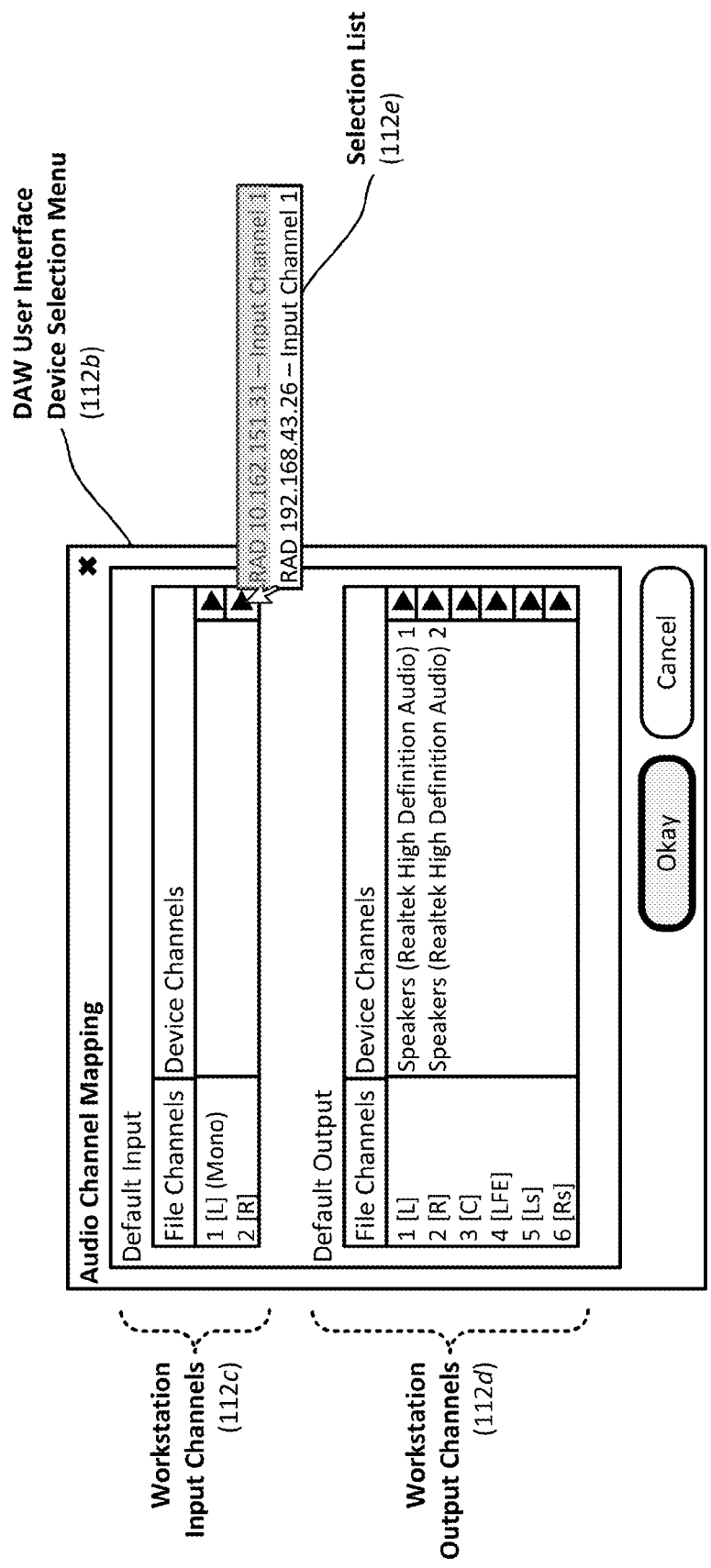
FIG. 7 illustrates an example user interface that can be used in certain embodiments of the present invention to select a remote audio device as a default audio device for playback and/or recording.

FIG. 7 illustrates an example user interface that can be used to select channels provided by a remote audio device for distributed audio playback and/or recording. Such a user interface includes a digital audio workstation user interface device selection menu 112b listing a plurality of workstation input channels 112c available to be associated with an audio input device (for example, a microphone), and a plurality of workstation output channels 112d available to be associated with an audio output device (for example, a speaker). The workstation channels may also be referred to as "file channels", and may be distinguished from each other by a channel index such as "1 [L]" or "2 [R]". For each workstation channel, a corresponding audio device may be selected. For example, FIG. 7 illustrates an example embodiment of a digital audio workstation having two available input channels 112c: a left stereophonic channel and a right stereophonic channel. For each of these two channels, a selection list 112e indicating available device channels may be accessed. The available device channels included in selection list 112e may include channels provided by a networked client device, also referred to as a remote audio device ("RAD"). Channels provided by an audio device that is local to the server, such as an integrated microphone or a wired microphone connected to an audio jack, may also be indicated in selection list 112e. A user may select a device to be associated with a particular workstation channel by interacting with selection list 112e. Thus even where multiple different client devices are connected to server, such as in the example embodiment illustrated in FIG. 1, the digital audio workstation is able to interact with the channels provided by such devices as if all of the channels were provided by a single multichannel virtual device.

For example, in one embodiment a user wishes to use a smartphone as a remote microphone to record audio data which is to be subsequently processed by a digital audio workstation running on a server computer. A client interface application running on the smartphone is used to establish a TCP connection to the server. This can be accomplished by using, for example, the example interface illustrated in FIG. 5. Once such a connection has been established and is detected by the digital audio workstation, the digital audio workstation generates a notification message such as that illustrated in FIG. 6. As illustrated, this message provides the user of the server device with the option to directly access audio hardware settings to configure how the digital audio workstation will handle incoming audio data generated by the smartphone. These configuration settings can be accessed using, for example, the example device selection menu illustrated in FIG. 7. For example, the user can select a particular workstation input channel and associate that channel with the newly connected remote audio device. Where the smartphone includes a stereophonic microphone capable of generating multiple channels of audio data, the device selection menu can be used to allocate left and right workstation channels to the left and right audio channels provided by the smartphone. In an alternative embodiment in which the user wishes to use the smartphone as a remote playback device for audio data processed by the server, the user may use the listing of available workstation output channels provided in the device selection menu to allocate the smartphone output channels to corresponding output channels of the digital audio workstation.

FIG. 3B is a flowchart illustrating an example methodology 20 for using server device 100 to record audio data that is collected by one or more client devices and that is received by server device 100 via a network connection. As illustrated in FIG. 3A, methodology 20 can be performed after a network connection is established between server device 100 and selected client device 340, and is optionally performed simultaneously with distributed audio playback methodology 30. Distributed audio recording methodology 20 commences when a networked client device 340 generates audio data (21), for example by recording sounds with a microphone. The generated audio data is transmitted via network 200 to server device 100, where it is written to a ring buffer (22). Where multiple channels of audio data are received by a server device, either as a result of concurrent recording by multiple client devices or polyphonic recording by a single client device, each incoming channel of audio data can be separately written to a dedicated ring buffer. In one embodiment, the incoming audio data is written to the ring buffer by audio framework 120, and more specifically, by audio engine 122. The ring buffer can be used to compensate for variations in the audio data transfer rate across the TCP connection.

As the incoming data is being written to the ring buffer, audio stream scheduler 124 is optionally configured to generate updated synchronization (clock) information based on a master clock source (23). In one embodiment the master clock source is provided by an audio device integrated with server device 100, such as a processor clock provided by a sound card installed in server device 100. However, in other embodiments a different master clock source can be specified by a user. This synchronization information can be used to synchronize data collected from different audio devices which use different clock frequencies. For example, certain embodiments of the systems disclosed herein can be configured to simultaneously record audio data from a monophonic microphone embedded in a smartphone and a stereophonic microphone coupled to a desktop computer. Both the smartphone and the desktop computer can be connected to a server device via TCP connections, and each device may use a different clock frequency. Synchronization data generated based on a master clock provided at the server device enables audio data recorded by these two different devices to be synchronized. Audio stream scheduler 124 can use the synchronization information to calculate an appropriate read position from the ring buffer for each of the incoming audio streams (24).

In embodiments in which audio data is exchanged with a single client device, and in which there will thus be no inconsistencies with respect to clock frequency, generation of the aforementioned synchronization information may be omitted. In that case, audio stream scheduler 124 can incorporate an appropriate delay when calculating the read position from the ring buffer (24). The delay can be configured to eliminate or reduce the likelihood that the incoming data stream will be interrupted by instabilities in the network data transfer rate. Thus generating the synchronization information should be considered optional, and may be omitted, for example, in embodiments where audio data is exchanged with a single client device. As a result, the box corresponding to the generation of synchronization information is illustrated with broken lines in FIG. 3B. Where this functionality is omitted, the incoming audio data can be written to the ring buffer, a delay suitable to compensate for network delays can be introduced, and then the audio data can be read from the ring buffer.

Still referring to FIG. 3B, audio engine 122 can be configured to read audio data from the ring buffer (25). As set forth above, the read position may be calculated by audio stream scheduler 124 based on synchronization information and/or may include a delay configured to compensate for network delays. The sequence of writing data to the ring buffer, introducing an appropriate delay, and reading data from the ring buffer can be looped indefinitely as long as the recording operation continues. The data read from the ring buffer is provided to digital audio workstation 110, and in particular, to audio stream processing module 114 (26). Digital audio workstation 110 can be configured to take a wide variety of actions with respect to the received audio data, such as writing the data to a file, applying digital signal processing effects to the data, generating waveform display data for presentation on a display screen, and analyzing the received data according to predetermined pattern recognition algorithms (such as may be used in certain text-to-speech applications). Digital audio workstation 110 can be configured to take appropriate additional or alternative actions in other embodiments, and it will be appreciated that the present invention is not intended to be limited to any particular processing that occurs at digital audio workstation 110. Once the incoming data stream is provided to digital audio workstation 110, user interface module 112 is optionally configured to update the digital audio workstation user interface (27), for example to display a waveform associated with the incoming data stream; where multiple channels of incoming data are provided, multiple waveforms may be generated.

FIG. 3C is a flowchart illustrating an example methodology 30 for audio playback at one or more client devices that are connected to server device 100 via a network connection. As illustrated in FIG. 3A, methodology 30 can be performed after a network connection is established between server device 100 and selected client device 340, and is optionally performed simultaneously with distributed audio recording methodology 20. Distributed audio playback methodology 30 commences when digital audio workstation 110 initiates audio playback (31), such as in response to a user command received via user interface module 112. Digital audio workstation 110 provides the audio data that is to be played back to audio engine 122, which is configured to write such data to a ring buffer (32). Where multiple channels of audio data are to be played back, for example where the audio data corresponds to a sound recording provided in 5.1 channel surround sound, each channel of audio data can be separately written to a dedicated ring buffer. The ring buffer can be used to compensate for variations in the audio data transfer rate across the TCP connection.

As the audio data is being written to the ring buffer, audio stream scheduler 124 is optionally configured to generate updated synchronization information based on a master clock source (33). In one embodiment the master clock source is provided by an audio device integrated with server device 100, such as a processor clock provided by a sound card installed in server device 100. However, in other embodiments a different master clock source can be specified by a user. This synchronization information can be used to synchronize data to be played back using different audio devices which use different clock frequencies or which otherwise communicate with server device 100 using different parameters. Appropriate communication parameters for the various playback devices can be established, and are known to audio stream scheduler 124, based on the creation of a unique synchronization player for each client device upon initial device connection, as indicated by reference numeral 15 in FIG. 3A.

Thus, for example, certain embodiments of the systems disclosed herein can be configured to simultaneously playback audio data at a smartphone and a surround sound stereo system connected to a desktop computer. Both the smartphone and the desktop computer can be connected to a server device via TCP connections, although the devices may use different clock frequencies for audio playback. Synchronization data that is generated based on a master clock provided by the server device 100 and that is based on the unique synchronization player for each device enables audio data to be streamed to the differently-configured devices synchronously. Specifically, audio stream scheduler 124 can use the synchronization information and the parameters of the synchronization player to calculate appropriate read positions from the ring buffer for each channel being streamed to a different playback device (34). As another example, a multi-channel sound recording, such as a 5.1 channel surround sound recording, is played back using a plurality of devices that, taken individually, are capable of only one- or two-channel playback. By sending one or two different channels of audio data to each of the plurality of devices, and by locating the devices appropriately, 5.1 channel surround sound playback can be simulated using a plurality of one- or two-channel devices.

In embodiments in which audio data is provided to a single playback device, and in which there will thus be no inconsistencies with respect to clock frequency or other device parameters, generation of the aforementioned synchronization information may be omitted. In that case, audio stream scheduler 124 can incorporate an appropriate delay when calculating the read position from the ring buffer (34). In such embodiments, the delay can be configured to eliminate or reduce the likelihood that the received data stream will be interrupted by instabilities in the network data transfer rate. Thus generating the synchronization information should be considered optional, and may be omitted, for example, in embodiments where audio data is provided to a single playback device. As a result, the box corresponding to the generation of synchronization information is illustrated with broken lines in FIG. 3C. Where this functionality is omitted, the outgoing audio data can be written to the ring buffer, a delay suitable to compensate for network delays can be introduced, and then the audio data can be read from the ring buffer (35).

Still referring still to FIG. 3C, audio engine 122 can be configured to read audio data from the ring buffer based on the read position calculated by audio stream scheduler 124 (35). The sequence of writing data to the ring buffer, introducing an appropriate delay, and reading data from the ring buffer can be looped indefinitely as long as the playback operation continues. The data read from the ring buffer is then sent via the network connection to one or more remote client devices 340 (36). Once received, the audio data can be played by client device 340 (37). In certain embodiments different channels of audio data are distributed to a variety of different client devices, while in other embodiments multiple channels of audio data are distributed to a single client device that is capable of multichannel playback, such as a desktop computer connected to a 7.1 channel surround sound system. This methodology allows audio assets processed by digital audio workstation 110 to be played back using one or more remotely-located client audio devices that are connected to server device 100 via a TCP network connection.

FIG. 4 is a block diagram illustrating an example audio sample synchronization methodology that can be used in conjunction with the audio recording and playback methodologies illustrated in FIGS. 3B and 3C. As described above, in certain embodiments a ring buffer is used to compensate for variations in data transfer rate across a TCP connection. A ring buffer is also optionally used to synchronize data that is exchanged amongst devices which use different clock frequencies or other communication parameters. As illustrated in FIG. 4, ring buffer 60 comprises a plurality of data registers capable of storing audio data. Available data registers 62 are available to have new audio data written thereto and are illustrated as being clear; in-use data registers 64 store audio data that has not yet been read from ring buffer 60 and are illustrated as being shaded. Regardless of whether an audio recording or an audio playback operation is being conducted, audio engine 122 can be configured to write audio data 50 to ring buffer 60 at a write position 52. When the data register associated with write position 52 becomes full, write position 52 progresses to the next available data register. As a result a portion of ring buffer 60 contains a portion of audio data 50 at any given point during the recording or playback operation.

Still referring to FIG. 4, a master clock source 70 can be configured to provide updated clock information 72 to audio stream scheduler 124. In one embodiment master clock source 70 is provided by an audio device integrated with the server, such as a processor clock provided by a sound card installed in the server. However, in other embodiments a different master clock source can be specified by a user. In the context of an audio recording operation, clock information 72 can be used to synchronize audio data collected from different audio devices using different clock frequencies. In the context of an audio playback operation, clock information 72 can be used to synchronize audio data to be played back using different audio devices which use different clock frequencies or which otherwise communicate with the server using different parameters. Appropriate communication parameters for the various playback devices can be established, and are known to audio stream scheduler 124, based on the creation of a unique synchronization player for each client device upon initial device connection, as indicated by reference numeral 15 in FIG. 3A.

In such embodiments audio stream scheduler 124 can be configured to determine a calculated read position 74 from which synchronized audio data 80 can be read from ring buffer 60. In certain embodiments, this calculated read position is based on updated clock information 72 received from master clock source 70, as described above. In other embodiments, for example where audio data is exchanged with a single device and where there will thus be no inconsistencies with respect to clock frequency or other device parameters, audio stream scheduler 124 can be configured to determine a calculated read position 74 based on the incorporation of an appropriate delay configured to eliminate or reduce the likelihood that the data stream will be interrupted by instabilities in the network data transfer rate. Once calculated read position 74 is established, synchronized audio data 80 is read from ring buffer 60 and passed to audio engine 122 for further processing. For example, in the case of a recording operation, audio engine 122 can be configured to pass synchronized audio data 80 to digital audio workstation 110, such as to audio stream processing module 114, as illustrated in FIG. 3B. Or, in the case of a playback operation, audio engine 122 can be configured to transmit synchronized audio data 80 over network 200 to a client device, as illustrated in FIG. 3C.

CONCLUSION

Numerous variations and configurations will be apparent in light of this disclosure. For instance, one example embodiment provides a computer-implemented method that comprises establishing a network connection between a client audio device and a server device. The method further comprises transmitting audio data between the client audio device and the server device across the network connection. The method further comprises writing at least a portion of the audio data to a buffer managed by the server device. The method further comprises reading audio data from the buffer after a delay. The method further comprises processing the audio data using a digital audio workstation running on the server device. In some cases establishing the network connection further comprises assigning an IP address to the client audio device. In some cases the network connection is a TCP connection. In some cases the method further comprises (a) establishing a second network connection between a second client audio device and the server device; and (b) transmitting second audio data between the second client audio device and the server device across the second network connection. In some cases the method further comprises (a) establishing a second network connection between a second client audio device and the server device; and (b) transmitting second audio data between the second client audio device and the server device across the second network connection, wherein the audio data and the second audio data comprise different channels of a multi-channel sound recording. In some cases transmitting the audio data between the client audio device and the server device comprises transmitting the audio data from the client audio device to the server audio device. In some cases the audio data is read from the buffer before it is transmitted between the client audio device and the server device.

Another example embodiment of the present invention provides a computer-implemented method that comprises receiving, by a server device, audio data that was recorded using a microphone associated with an audio device. The audio data is received via a network connection existing between the server device and the audio device. The method further comprises writing the received audio data to a buffer. The method further comprises reading the received audio data from the buffer after a delay. The method further comprises processing the audio data that is read from the buffer using a digital audio workstation. In some cases the delay is calculated to compensate for network delays introduced as a result of receiving the audio data via the network connection. In some cases the audio device comprises a smartphone and the server device comprises a device selected from a group consisting of a laptop computer and a desktop computer. In some cases the network connection is a TCP network connection. In some cases the method further comprises further comprising receiving, by the server device, second audio data that was recorded using a microphone associated with a second audio device, wherein the delay is calculated based on (a) a clock speed of the audio device and (b) a clock speed of the second audio device. In some cases the method further comprises receiving, by the server device, second audio data that was recorded using a microphone associated with a second audio device, wherein the second audio data is received via a second network connection existing between the server device and the second audio device. In some cases the method further comprises (a) receiving, by the server device, second audio data that was recorded using a microphone associated with a second audio device, wherein the second audio data is received via a second network connection existing between the server device and the second audio device; and (b) using the digital audio workstation the generate a multichannel sound recording wherein the audio data corresponds to a first audio channel of the multichannel sound recording and the second audio data corresponds to a second audio channel of the multichannel sound recording.

Another example embodiment of the present invention provides a computer-implemented method that comprises saving audio data in a buffer. The method further comprises reading the audio data from the buffer after a delay. The method further comprises transmitting the audio data that is read from the buffer to a client audio device, wherein the audio data is transmitted over a TCP network connection. The method further comprises playing back the audio data using a speaker associated with the client audio device. In some cases the method further comprises (a) negotiating communication parameters associated with the TCP network connection; and (b) creating a synchronization player based on the negotiated communication parameters, wherein the delay is determined by the synchronization player. In some cases the method further comprises (a) saving second audio data in a second buffer; (b) reading the second audio data from the second buffer after a second delay; (c) transmitting the second audio data that is read from the second buffer to a second client device over the TCP network connection; and (d) playing back the second audio data using a second speaker associated with the second client audio device, wherein the audio data and the second audio data comprise separate channels of a multichannel sound recording.

Another example embodiment of the present invention provides a distributed audio processing system that comprises an audio engine configured to establish a TCP network connection between a server device that hosts the audio engine and a remotely-located client device. The audio engine is further configured to write audio data to a buffer managed by the server device. The system further comprises an audio stream scheduler configured to determine a read position corresponding to the buffer. The audio engine is further configured to read audio data from the buffer at the determined read position. The audio data that is written to and read from the buffer is transmitted between the server device and the remotely-located client device via the TCP network connection. In some cases the system further comprises a user interface module configured to generate a user notification in response to establishment of the TCP network connection between the server device and the remotely-located client device. In some cases the buffer is a ring buffer.

Another example embodiment of the present invention provides a computer program product encoded with instructions that, when executed by one or more processors, causes a process to be carried out. The process comprises transmitting audio data between a client audio device and a server device via a transmission control protocol (TCP) network connection. The process further comprises writing at least a portion of the audio data to a buffer managed by the server device. The process further comprises reading audio data from the buffer after a delay. The process further comprises processing the audio data using a digital audio workstation running on the server device. In some cases transmitting the audio data between the client audio device and the server device further comprises: (a) sending first audio data from the client audio device to the server device; and (b) sending second audio data from the server device to the client audio device. In some cases transmitting the audio data between the client audio device and the server device further comprises sending first audio data from the client audio device to the server device simultaneously with sending second audio data from the server device to the client audio device. In some cases the audio engine is configured to establish a plurality of TCP network connections between the server device and a plurality of remotely-located client devices that, taken collectively, form a virtual audio device that exchanges audio data with the server device. In some cases the TCP network connection is a wireless connection.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method comprising:
    establishing network connections between a plurality of client audio devices and a server device, wherein each of the plurality of client audio devices is assigned a network address;
    generating, at the server device, an audio channel mapping user interface that lists multiple network addresses and multiple audio channels, wherein each of the audio channels forms part of an audio data file;
    receiving user input via the audio channel mapping user interface, wherein the user input associates a particular one of the network addresses with a particular one of the audio channels;
    transmitting audio data that forms the particular audio channel between a client audio device assigned to the particular network address and the server device;
    writing at least a portion of the audio data to a buffer managed by the server device;
    reading the audio data from the buffer after a delay; and
    processing the audio data using a digital audio workstation running on the server device.

2. The computer-implemented method of claim 1, wherein establishing the network connections further comprises assigning an internet protocol (IP) address to each of the client audio devices.

3. The computer-implemented method of claim 1, wherein each of the network connections is a transmission control protocol (TCP) connection.

4. The computer-implemented method of claim 1, further comprising:
    receiving second user input via the audio channel mapping user interface, wherein the second user input associates a second particular one of the network addresses with a second particular one of the audio channels; and
    transmitting audio data that forms the second particular audio channel between a client audio device assigned to the second particular network address and the server device.

5. The computer-implemented method of claim 1, further comprising:
    receiving second user input via the audio channel mapping user interface, wherein the second user input associates a second particular one of the network addresses with a second particular one of the audio channels; and
    transmitting audio data that forms the second particular audio channel between a client audio device assigned to the second particular network address and the server device, wherein the particular audio channel and the second particular audio channel comprise a multichannel sound recording.

6. The computer-implemented method of claim 1, wherein transmitting the audio data between the client audio device assigned to the particular network address and the server device comprises transmitting the audio data from the client audio device assigned to the particular network address to the server device.

7. The computer-implemented method of claim 1, wherein the audio data is read from the buffer before it is transmitted between the client audio device assigned to the particular network address and the server device.

8. A computer-implemented method comprising:
    receiving, by a server device, multichannel audio data that was recorded using a plurality of microphones associated with a corresponding plurality of audio devices, wherein each channel of the multichannel audio data is received via a separate network connection existing between the server device and one of the audio devices, and wherein each of the audio devices is associated with a network address;
    generating, at the server device, an audio channel mapping user interface that lists multiple network addresses and multiple audio data file channels;

receiving user input via the audio channel mapping user interface, wherein the user input associates a particular one of the network addresses with a particular one of the audio data file channels;

receiving, via a particular network connection that exists between the server device and a particular audio device that is associated with the particular network address, audio data that was recorded using a microphone associated with the particular audio device;

writing the received audio data to a buffer;

reading the received audio data from the buffer after a delay; and storing the audio data that is read from the buffer in the particular audio data file channel defined by the user input.

9. The computer-implemented method of claim 8, wherein the delay is calculated to compensate for network delays introduced as a result of receiving the audio data via the particular network connection.

10. The computer-implemented method of claim 8, wherein the particular audio device comprises a smartphone and the server device comprises a device selected from a group consisting of a laptop computer and a desktop computer.

11. The computer-implemented method of claim 8, wherein each of the plurality of network connections is a transmission control protocol (TCP) network connection.

12. The computer-implemented method of claim 8, further comprising:

receiving second user input via the audio channel mapping user interface, wherein the second user input associates a second particular one of the network addresses with a second particular one of the audio data file channels; and receiving, via a second particular network connection that exists between the server device and a second particular audio device that is associated with the second particular network address, second audio data that was recorded using a second microphone associated with the second particular audio device, wherein the delay is calculated based on (a) a clock speed of the particular audio device and (b) a clock speed of the second particular audio device.

13. The computer-implemented method of claim 8, further comprising:

receiving second user input via the audio channel mapping user interface, wherein the second user input associates a second particular one of the network addresses with a second particular one of the audio data file channels; and receiving, via a second particular network connection that exists between the server device and a second particular audio device that is associated with the second particular network address, second audio data that was recorded using a second microphone associated with the second particular audio device.

14. The computer-implemented method of claim 8, further comprising:

receiving second user input via the audio channel mapping user interface, wherein the second user input associates a second particular one of the network addresses with a second particular one of the audio data file channels;

receiving, via a second particular network connection that exists between the server device and a second particular audio device that is associated with the second particular network address, second audio data that was recorded using a second microphone associated with the second particular audio device; and using a digital audio workstation to generate a multichannel sound recording wherein the audio data corresponds to a first audio channel of the multichannel sound recording and the second audio data corresponds to a second audio channel of the multichannel sound recording.

15. A computer-implemented method comprising:

receiving, at a server device, a multichannel digital sound recording comprising a plurality of audio data file channels;

receiving, at the server device, a connection request from each of a plurality of client audio devices;

establishing a transmission control protocol (TCP) network connection between the server device and each of the plurality of client audio devices, wherein each of the client audio devices is associated with a network address;

generating, at the server device, an audio channel mapping user interface that lists multiple network addresses and multiple audio data file channels;

receiving user input via the audio channel mapping user interface, wherein the user input associates a particular one of the network addresses with a particular one of the audio data file channels;

extracting audio data from the multichannel digital sound recording, wherein the extracted audio data corresponds to the particular one of the audio data file channels identified by the user input;

saving the extracted audio data in a buffer;

reading the extracted audio data from the buffer after a delay;

transmitting the audio data that is read from the buffer to a particular client audio device that is associated with the particular network address; and playing back the transmitted audio data using a speaker associated with the particular client audio device.

16. The computer-implemented method of claim 15, further comprising:

negotiating communication parameters associated with the TCP network connection between the server device and the particular client audio device; and creating a synchronization player based on the negotiated communication parameters, wherein the delay is determined by the synchronization player.

17. The computer-implemented method of claim 15, further comprising:

receiving second user input via the audio channel mapping user interface, wherein the second user input associates a second particular one of the network addresses with a second particular one of the audio data file channels;

extracting second audio data from the multichannel digital sound recording, wherein the extracted second audio data corresponds to the second particular one of the audio data file channels;

saving the extracted second audio data in a second buffer;

reading the extracted second audio data from the second buffer after a second delay;

transmitting the second audio data that is read from the second buffer to a second client audio device that is associated with the second particular network address; and playing back the transmitted second audio data using a second speaker associated with the second client audio device;

wherein the transmitted audio data and the transmitted second audio data comprise separate channels of the multichannel digital sound recording.

18. A distributed audio processing system comprising a memory device and a processor that is operatively coupled to the memory device, wherein the processor is configured to execute instructions stored in the memory device that, when executed, cause the processor to carry out an audio distribution process that comprises:
- establishing transmission control protocol (TCP) network connections between a server device and each of a plurality of remotely-located client audio devices, wherein each of the plurality of remotely-located client audio devices is assigned a network address;
- generating, at the server device, an audio channel mapping user interface that lists multiple network addresses and multiple audio channels, wherein each of the audio channels forms part of an audio data file;
- receiving user input via the audio channel mapping user interface, wherein the user input associates a particular one of the network addresses with a particular one of the audio channels;
- transmitting audio data that forms the particular audio channel between a particular remotely-located client audio device to which the particular network address is assigned and the server device;
- writing at least a portion of the audio data to a buffer managed by the server device;
- determining a read position corresponding to the buffer; and
- reading the audio data from the buffer at the determined read position;
- wherein the audio data that is written to and read from the buffer is transmitted between the server device and the particular remotely-located client audio device via one of the TCP network connections.

19. The distributed audio processing system of claim 18, the audio distribution process further comprising generating a user notification in response to establishment of a particular TCP network connection between the server device and the particular remotely-located client audio device.

20. The distributed audio processing system of claim 18, wherein the buffer comprises a ring buffer.

21. The distributed audio processing system of claim 18, wherein the TCP network connections between the server device and each of the remotely-located client audio devices, taken collectively, form a virtual audio device that exchanges audio data with the server device.

22. The distributed audio processing system of claim 18, wherein the TCP network connections are wireless.

23. A non-transitory computer readable medium encoded with instructions that, when executed by one or more processors, cause a process to be carried out, the process comprising:
- generating, at a server device, an audio channel mapping user interface that lists multiple network addresses and multiple audio channels, wherein each of the listed audio channels is associated with an audio data file;
- receiving user input via the audio channel mapping user interface, wherein the user input associates a particular one of the network addresses with a particular one of the audio channels;
- transmitting audio data that forms the particular audio channel between a client audio device assigned to the particular network address and the server device via a transmission control protocol (TCP) network connection;
- writing at least a portion of the audio data to a buffer managed by the server device;
- reading the audio data from the buffer after a delay; and
- processing the audio data using a digital audio workstation running on the server device.

24. The computer program product of claim 23, wherein transmitting the audio data between the client audio device and the server device further comprises:
- sending first audio data from the client audio device to the server device; and
- sending second audio data from the server device to the client audio device.

25. The computer program product of claim 23, wherein transmitting the audio data between the client audio device and the server device further comprises sending first audio data from the client audio device to the server device simultaneously with sending second audio data from the server device to the client audio device.

* * * * *